July 17, 1923.
Re. 15,655
E. A. McKOY ET AL
STUMP HARVESTER
Original Filed Sept. 21, 1917
2 Sheets-Sheet 1
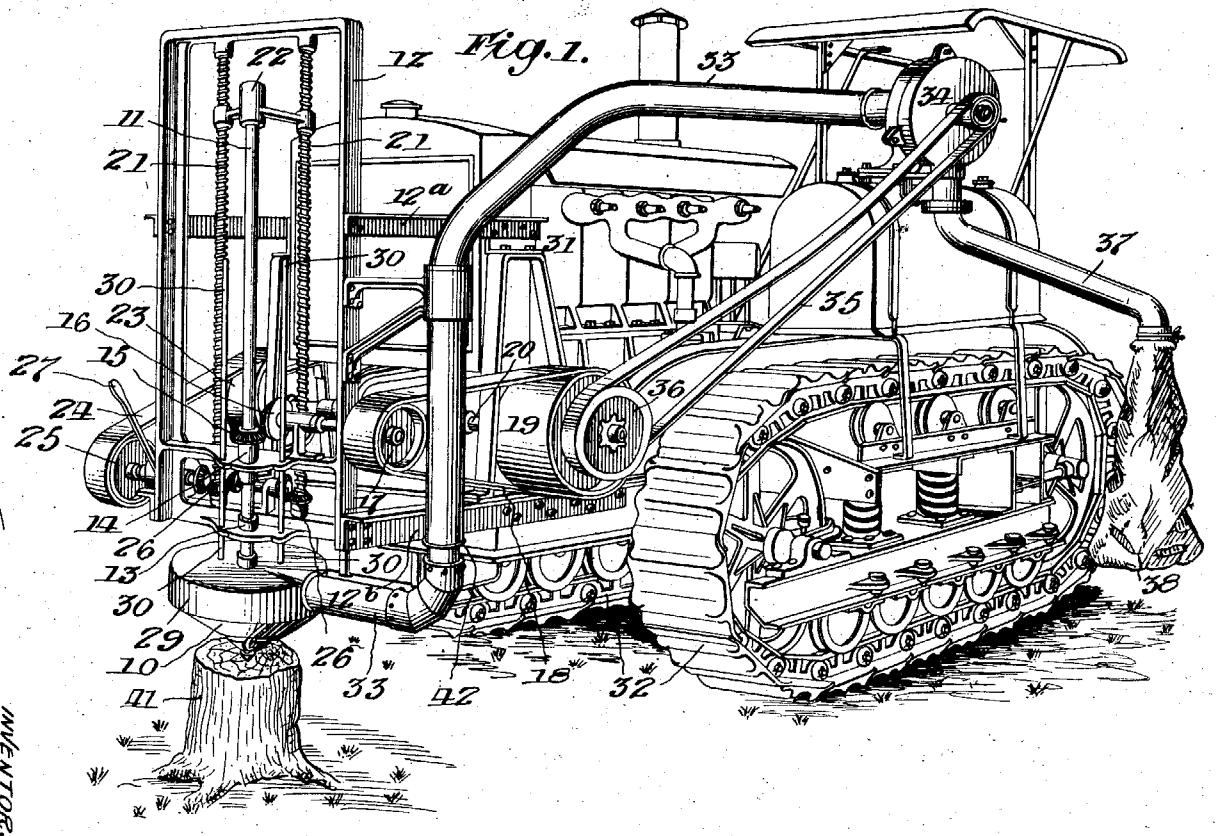
INVENTORS,
Edwin A. McKoy
and George H. Moore,
by Prentiss, Stone & Boyden,
ATTORNEYS.

July 17, 1923. Re. 15,655
E. A. McKOY ET AL
STUMP HARVESTER
Original Filed Sept. 21, 1917 2 Sheets-Sheet 2
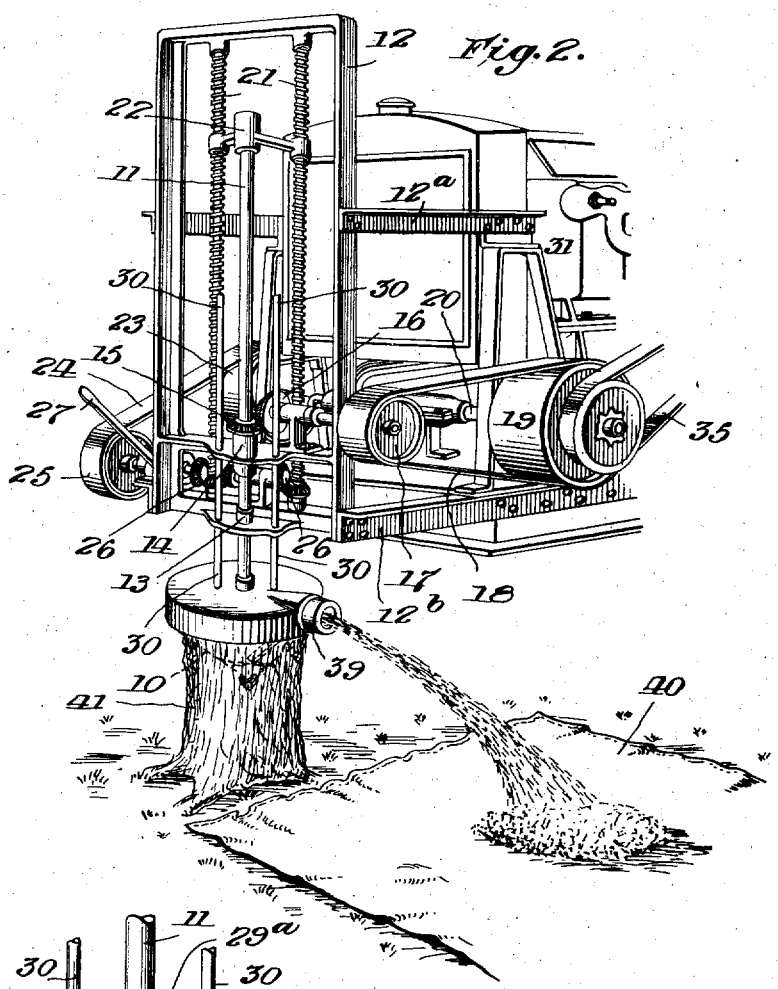
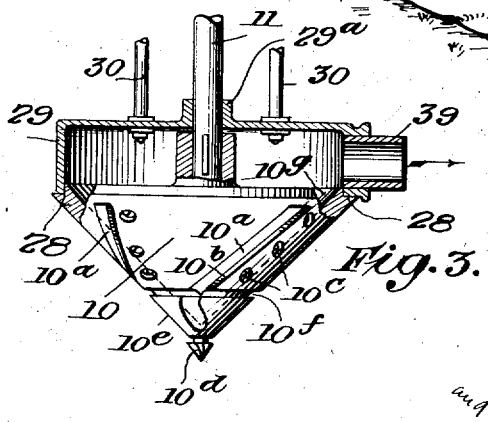
INVENTORS,
Edwin A. McKoy,
and George H. Moore,
by Prentiss, Stone & Boyden,
ATTORNEYS.

Reissued July 17, 1923. Re. 15,655

UNITED STATES PATENT OFFICE.

EDWIN A. McKOY AND GEORGE D. MOORE, OF NEW ORLEANS, LOUISIANA.

STUMP HARVESTER.

Original application filed September 21, 1917, Serial No. 192,566. Renewed July 9, 1919, Serial No. 309,766. Original No. 1,313,708, dated August 19, 1919. Application for reissue filed May 20, 1921. Serial No. 471,259.

*To all whom it may concern:*

Be it known that we, EDWIN A. McKOY and GEORGE D. MOORE, citizens of the United States, residing at New Orleans, in the parish of Orleans and State of Louisiana, have invented certain new and useful Improvements in Stump Harvesters; and we do hereby declare the following to be a full, clear, and exact description of the invention, such as will enable others skilled in the art to which it appertains to make and use the same.

This invention relates to machines for disintegrating and thereby removing standing stumps.

Machines of this general character are disclosed in prior Patents Nos. 1,104,535 and 1,164,659, heretofore granted A. L. Moore, jointly with G. D. Moore, one of the present applicants. In these prior structures, however, no means were provided for confining or directing the disintegrated material, such material on the contrary being scattered in all directions.

When, however, as in the case of turpentine stumps, the disintegrated material contains valuable ingredients which it is desired to recover, it becomes highly important to effectively confine and collect the chips or cuttings as they come from the stump. The primary and general object of the present invention is, therefore, to provide means in co-operative relation with the cutters, so constructed and arranged as to receive the disintegrated or comminuted material as it is thrown from the cutters, and deliver it into a suitable receptacle.

A further and more specific object of the invention is to provide a housing surrounding the upper end of a hollow boring or cutting tool, and positioned to receive the chips or cuttings from the interior thereof, such housing having an outlet through which the cuttings are discharged.

A still further object is to provide, in connection with such housing, pneumatic or other suitable conveyor means for carrying away the chips or cuttings and delivering them at any desired point.

With these and other objects in view, the invention comprises certain novel constructions, combinations and arrangement of parts as will be hereinafter more fully described and claimed.

In the drawing:

Figure 1 is a perspective view of the improved mechanism mounted upon a dirigible power plant of the type ordinarily known as a caterpillar tractor;

Fig. 2 is a perspective view of the invention, disclosing a different manner of conserving the cuttings from the boring tool, and Fig. 3 is a view, partly in side elevation and partly in diametrical section, of the boring or cutting tool, and housing therefor.

Like characters of reference designate corresponding parts throughout the several views.

The entire cutting mechanism is mounted upon a self-propelled vehicle (shown conventionally in Fig. 1) having an engine 31 and traction devices 32, whereby the cutting mechanism is moved from place to place.

The improved stump harvesting or disintegrating mechanism which forms the subject matter of this application comprises a boring tool or cutter head 10, hereinafter more fully described, and carried by the lower end of a vertical shaft 11, which in turn is mounted upon a frame 12, secured to the self-propelled vehicle or tractor as by means of upper and lower arms or braces $12^a$ and $12^b$. The shaft 11 is mounted in any manner to move vertically, that is to say, longitudinally of its axis, relative to the frame 12, and is here shown as operating through bearings 13 and 14, carried by said frame. The shaft is driven by means of a bevel gear 15 splined upon such shaft so as to permit vertical movement of the shaft therethrough, the said gear being in turn driven by a bevel gear 16 from a pulley 17. The pulley 17 is driven by a belt 18 from a pulley 19 which is carried upon the engine shaft 20.

Mounted also upon the frame 12 and journaled therein, are a pair of vertical screws 21, carrying a yoke 22, receiving the end of the shaft 11 and acting as a thrust bearing, whereby the shaft 11 and cutter 10 are advanced as the yoke 22 is moved downwardly by rotating the screws 21.

For rotating the screws 21, a pulley 23 is mounted upon the engine shaft and through the medium of a belt 24 drives a pulley 25, which, in turn, drives a train of gears 26, thereby rotating the screws 21, some of said train of gears 26 being rigidly carried upon said screws. Any usual and ordinary type of reversing mechanism, (not shown) is employed for driving the screws in either direction to either raise or lower the cutting tool 10, the control lever for such reversing mechanism being shown conventionally at 27.

The specific construction of the cutting tool 10 forms no part of the present invention. It may, for instance, be of the type disclosed in the above mentioned patents to A. L. and G. D. Moore, one of whom is joint inventor of the present improvements. Or, as we have conventionally illustrated, by way of example, in the drawings, the tool or cutter head may be of the type shown and described in detail in Patent #1,313,710, granted August 19, 1919, to E. A. McKoy, the other present joint inventor, but it will be understood that the present invention is in no wise limited to the use of a tool of this exact type. As shown in present Fig. 3, and as illustrated more in detail in said patent, such a tool or cutter head is in the shape of a solid of revolution, preferably, an inverted cone. It is of hollow construction, or formed with one or more interior recesses $10^g$, and is provided with slots or openings $10^a$ in its conical wall, communicating with the interior thereof, and in these openings are set blades or knives $10^b$, secured by screws $10^c$ in such position that the cutting edges project slightly beyond the working face or cutting surface of the tool, after the manner of a carpenter's plane. Thus it will be seen that the interior hollow or recess $10^g$ is on the inside of the conical wall, the outside of which forms the cutting surface, or, in other words, such recess is opposite the cutting surface or working face of the cutter head. A centering bit $10^d$, of any approved construction, is arranged to form the apex of the cone, and between this bit and the hollow body of the main cutter is preferably formed an intermediate or auxiliary cutter $10^e$, separated from the main cutter by an annular groove $10^f$.

In order to confine and direct the chips or cuttings as they are thrown off from the cutting tool, a housing is provided. As clearly illustrated in Fig. 3, this housing is indicated at 29, and preferably takes the form of a short cylinder, having its upper end closed and lower end open, as shown, and having a discharge outlet 39 located at its periphery. When the conical cutter head illustrated in Fig. 3 is employed, it is of substantially the same diameter as the cylindrical housing 29, and around the edge of the base of this cone is formed an annular groove, furrow, or rabbet 28, adapted to receive the lower edge of such housing, so as to produce a comparatively close-fitting joint between the cutter head and housing. It will be understood, however, that this joint is loose enough to permit the free rotation of the cutter head relative to the housing, the shaft 11, on which the cutter head is mounted, being journaled in the top wall of the housing at $29^a$, and the housing being held against rotation by means of stay rods 30, set into said top wall. These rods 30 slide freely through brackets carried by the frame 12, so as not to interfere with the vertical movement of the housing, which, as will be obvious, is raised and lowered with the cutter head, always maintaining the same relation thereto, and forming with the interior recess or recesses of the cutter head, a chamber to receive the cuttings.

As shown at Fig. 1 a pipe 33 is connected with the outlet 39 of the housing 29, which pipe leads to an exhaust fan 34 located at any convenient place upon the vehicle. As shown in Fig. 1, the exhaust fan 34 is driven by means of a belt 35 from a pulley 36 mounted upon the engine shaft. A discharge pipe from the fan 34 is also provided, leading to any desired receptacle for receiving the cuttings, generically shown by the bag 38. Thus the pipes 33 and 37, and the exhaust fan 34, constitute a pneumatic conveyor for withdrawing the cuttings from the housing and delivering them at any suitable point. To permit the vertical movement of the housing 29, a telescoping joint is provided in the pipe 33, adjacent the housing, as indicated at 42.

It is not, however, found necessary under all conditions to convey the cuttings through any pneumatic device, as the centrifugal force of the cutting tool itself will throw the cuttings through the outlet 39 of the housing 29, and the same may be caught in or upon any convenient receptacle, such as the sheet 40, as shown in Fig. 2.

In operation, the machine is driven by its self-contained power and guided to a standing stump such as indicated at 41. It is then manipulated until the boring tool or cutter head 10 is properly positioned or centered relative to the axis of such stump. The cutting tool 10, continuously driven at high speed by means of the shaft 11 and connecting gearing, from the pulley 19, is then lowered into engagement with the stump, and fed constantly downwardly, thus cutting away and disintegrating the wood. The disintegrated material passes through the openings or slots $10^a$ of the cutter body into the interior hollow or recess thereof, whence it enters the housing 29. It is then carried through the pneumatic conveyor pipe 33 to the bag or other receptacle 38, or is discharged by centrifugal force through the outlet 39 upon the sheet 40. The wood of standing stumps often contains material which can be chemically or otherwise removed from the woody fiber, and such material so removed, used in a commercial way, while the fibrous material itself may be employed in many different ways, the utilization of such disintegrated material forming the subject matter of other applications.

We claim:

1. In a stump harvester, a dirigible power plant, a boring tool comprising a cutter head having a recess opposite its cutting surface, a housing forming with the recess a chamber to receive the cuttings and means to discharge the cuttings from the housing to a pre-determined depository.

2. In a stump harvester, a dirigible power plant, a horizontally rotatable, vertically movable boring tool comprising a cutter head having a recess opposite its cutting surface, a housing forming with the recess a chamber to receive the cuttings and means to discharge the cuttings from the housing to a predetermined depository.

3. In a stump harvester, a power carrying vehicle, a boring tool mounted upon the vehicle and comprising a cutter head having a recess opposite its cutting face, a housing forming with the recess a chamber to receive the cuttings, means to discharge the cuttings from the housing to a pre-determined depository and means to actuate the boring tool from the power.

4. In a stump harvester, a power carrying vehicle, a horizontally rotatable, vertically movable boring tool comprising a cutter head having a recess opposite its cutting surface, a housing forming with the recess a chamber to receive the cuttings, means to discharge the cuttings from the housing to a pre-determined depository and means to independently rotate and vertically advance the boring tool and housing.

5. In a stump harvester, a power carrying vehicle, a boring tool carried by the vehicle comprising a cutter head having a recess formed opposite its cutting surface, a housing forming with the recess a chamber to receive the cuttings, means to discharge the cuttings from the housing to a pre-determined depository, means to rotate the boring tool from the vehicle, means to move the boring tool vertically by power from the vehicle and means to prevent rotation of the housing but permitting vertical movement of the housing with the boring tool.

6. In a stump harvester, a dirigible power plant, a boring tool carried by the power plant and comprising a dished cutter head having its cutting element upon the exterior, a housing embracing the head and forming with the recess of the head a chamber to receive the cuttings, means to discharge the cuttings from the housing to a pre-determined depository and means to move the boring tool vertically independently of its rotating movement.

7. In a stump harvester, a dirigible power plant, a horizontally rotatable, vertically movable boring tool comprising a dished cutter head having its cutting element upon the exterior, a housing embracing the head and forming with the recess of the head a chamber to receive the cuttings, means to discharge the cuttings from the housing to a pre-determined depository, means to drive the boring tool from the power plant, and independent means for accomplishing vertical movement of the boring tool.

8. In a stump harvester, a power carrying vehicle, a boring tool mounted upon the vehicle comprising a dished cutter head having its cutting element upon the exterior, a housing embracing the head and forming with the head a chamber to receive the cuttings, means to discharge the cuttings from the housing to a pre-determined depository and means to actuate the boring tool from the power.

9. In a stump harvester, a power carrying vehicle, a horizontally rotatable, vertically movable boring tool comprising a dished cutter head having its cutting element upon the exterior, a housing embracing the head and forming with the recess of the head a chamber to receive the cuttings, means to discharge the cuttings from the housing to a pre-determined depository and means to independently rotate and advance the boring tool from the power plant.

10. In a stump harvester, a power carrying vehicle, a boring tool carried by the vehicle comprising a dished cutter head having its cutting element upon the exterior, a housing embracing the head and forming with the recess of the head a chamber to receive the cuttings, means to discharge the cuttings from the housing to a pre-determined depository, means to rotate the boring tool from the vehicle, means to move the boring tool vertically by power from the vehicle, and means to prevent rotation of the housing while permitting vertical movement of the housing with the boring tool.

11. In a stump harvester, a dirigible power plant, a boring tool carried by the power plant comprising a discoid cutter head having a cutting element upon one face and a recess opposed thereto, a housing embracing the head and forming with the recess a chamber to receive the cuttings, means to discharge the cuttings from the housing to a pre-determined depository, means to rotate the boring tool from the power plant and means to move the boring tool vertically independently of its rotating movement.

12. In a stump harvester, a dirigible power plant, a horizontally rotatable, vertically movable boring tool comprising a discoid cutter head having a cutting element upon one face and a recess opposed thereto, a housing embracing the head and forming with the recess a chamber to receive the cutings, means to discharge the cuttings from the housing to a pre-determined depository, means to drive the boring tool from the power plant and independent means for accomplishing vertical movement of the boring tool.

13. In a stump harvester, a power carrying vehicle, a boring tool mounted upon the vehicle and comprising a discoid cutter head having a cutting element upon one face and recess opposed thereto, means to actuate the boring tool from the power, a housing embracing the cutter head and forming with the recess a chamber to receive the cuttings, means to discharge the cuttings from the housing to a pre-determined depository and means to actuate the boring tool from the power.

14. In a stump harvester, a power carrying vehicle, a boring tool driven from the power and comprising a cutter head having a recess opposite its cutting surface, a housing forming with the recess a chamber to receive the cuttings, means to drive the boring tool from the power, a pipe forming communication from the housing to an exhaust mechanism, and means to discharge the cuttings from the exhaust mechanism.

15. In a stump harvester, a power carrying vehicle, a cutting tool carried by and driven from the power comprising a cutter head having a recess opposite its cutting surface, a housing forming with the recess a chamber to receive the cuttings, an exhaust mechanism, a conduit leading from the cutting tool to the exhaust mechanism and provided with means for compensating for the movement of the cutting tool, means to drive the exhaust mechanism and means to discharge the cuttings from the exhaust mechanism.

16. In a stump harvester, the combination with a rotary cutter head, and means for supporting, rotating and feeding the same progressively into and through the stump, of a non-rotary housing accompanying the cutter head in its progressive movement through the stump, and serving to confine and direct the cuttings.

17. In a stump harvester, the combination with a rotary cutter head and means for supporting, rotating and feeding the same into the stump, of a housing adjacent the cutter head and serving to confine the cuttings, and means for holding said housing against rotation and for causing it to travel with the cutter head into the stump, whereby a constant relation between the cutter head and housing is preserved.

18. In a stump harvester, a hollow cutter head provided with a smooth working face, having openings therethrough, cutting knives projecting beyond said face and positioned to direct cuttings through the openings into the interior of the head, and means to evacuate the cuttings from the interior of the head and direct them to a predetermined depository.

19. In a stump harvester, the combination with a hollow cutter head, having an open end, of a shaft on which said head is rigidly mounted, means for rotating and advancing said shaft and cutter toward the stump, and a non-rotary housing movable with the cutter head as it advances, said housing enveloping the open end of said cutter head and positioned to receive cuttings from the interior thereof, said shaft passing through a wall of said housing.

20. In a stump harvester, the combination with a rotary cutter head, and means for supporting and rotating the same about a vertical axis, said cutter head having a working face at its lower end and an opening extending from said working face to the upper end thereof, of a non-rotary housing overlying and coextensive with the upper end of said cutter head, said housing having a lower open end adapted to receive the cuttings delivered upwardly through said opening.

21. In a stump harvester, the combination with a cutter head, and means for supporting and rotating the same about a vertical axis, said cutter head having an open upper end, of means for feeding the cutter head along such axis toward and into the stump to be harvested, and a non-rotatable housing, movable with said cutter head and shaped to follow the same into the stump, said housing being disposed above the upper open end of the cutter head and substantially enclosing the same for receiving and directing the cuttings.

22. In a stump harvester, the combination with a cutter head having an open upper end, of means for supporting and rotating said cutter head about a vertical axis, means for feeding said cutter head downwardly toward and into a stump, and a housing traveling with said cutter head in its downward movement through the stump, said housing having a lower open end enveloping the open end of said cutter head and positioned to receive the cuttings therefrom.

23. In a stump harvester, the combination with a rotary cutter head, of means for supporting, rotating and feeding the same toward the stump to be harvested, of non-rotary means traveling with the cutter head for confining and directing the cuttings, the largest outside dimension of said confining and directing means in a direction transverse to the path of travel of said cutter head being no greater than the largest dimension of the effective cutting area of the cutter head.

24. In a stump harvester, the combination with a rotary cutter head, of means for supporting, rotating and feeding the same toward the stump to be harvested, of non-rotary means traveling with the cutter head for confining and directing the cuttings, the largest outside dimension of said confining and directing means in a direction transverse to the path of travel of said cutter head being no greater than the effective diameter of said cutter head.

25. In a stump harvester, the combination with a rotary cutter head, of means for supporing, rotating and feeding the same toward the stump to be harvested, of a non-rotary housing traveling with the cutter head for confining and directing the cuttings, the largest outside dimension of said housing in a direction transverse to the axis of said cutter head being no greater than the effective diameter of said cutter head.

26. In a stump harvester, the combination with a rotary cutter head, of means for supporting, rotating and feeding the same toward the stump to be harvested, of a non-rotary cylindrical housing mounted co-axially with the cutter head, and traveling therewith, for confining and directing the cuttings, the external diameter of said housing being no greater than the effective diameter of said cutter head.

27. In a stump harvester, the combination with a cutter head formed with a working face in the shape of a solid of revolution and having an interior recess, the cutter head being provided with an opening extending through its working face and communicating with said recess, of a cylindrical housing of substantially the same external diameter as the cutter head disposed adjacent thereto, and forming with said recess a chamber to receive the cuttings passing in through said opening.

28. In a stump harvester, the combination with a cutter head in the shape of a solid of revolution, of a vertical shaft on which said cutter head is mounted, said cutter head having an upwardly opening interior recess, of means for feeding the cutter head and shaft toward the stump to be harvested, and a non-rotatable housing movable with said cutter head and mounted immediately above the same, said shaft passing through the top wall of the housing, said housing having a lower open end and forming with said upwardly opening recess a chamber to receive the cuttings.

29. In a stump harvester, the combination with a hollow cutter head, of means for supporting, rotating, and moving the same toward the stump to be harvested, said cutter head having knives arranged to deliver inwardly into the hollow of the head, and a housing movable with said cutter head, and positioned to receive cuttings from the interior thereof.

30. In a stump harvester, the combination with a cutter head having an interior recess, of means including a shaft for supporting, rotating and feeding the same toward the stump to be harvested, a non-rotatable housing journaling the shaft, but maintaining a fixed position longitudinally thereof, said housing being movable with the cutter head, and forming with said recess a chamber to receive the cuttings, and pneumatic means for removing the cuttings from said housing.

31. In a stump harvester, the combination with a hollow cutter head having an opening extending through its working face to admit the cuttings, of means for supporting and rotating said cutter head, a non-rotatable housing the edge of which engages said hollow cutter head with a relatively close fit, a conduit extending from said housing, and means for causing a current of air to flow in through said opening, and thence through said hollow cutter head, housing and conduit, whereby the cuttings are conveyed away.

In testimony whereof we affix our signatures.

EDW. A. McKOY.
GEORGE D. MOORE.